UNITED STATES PATENT OFFICE.

HENRY BLUMENBERG, JR., OF NEW YORK, N. Y.

BATTERY COMPOUND.

SPECIFICATION forming part of Letters Patent No. 638,040, dated November 28, 1899.

Application filed April 7, 1899. Serial No. 712,046. (No specimens.)

*To all whom it may concern:*

Be it known that I, HENRY BLUMENBERG, Jr., a citizen of the United States, residing at New York city, (Wakefield,) in the borough of Bronx, in the State of New York, have invented an Improvement in Battery Compounds, of which the following is a specification.

I have applied for patents on battery compounds in which bisulfate of sodium and chlorate of sodium are employed, and others in which bisulfate of sodium, chlorate of sodium, and aluminium sulfate are used.

In carrying on experiments in this line I have found that an excellent battery solution can be made of the tersulfate of aluminium and chlorate of sodium. This solution has not the low internal resistance that the above-named solutions have, but is one also of wonderful constancy. The action and reaction between the two compounds when they are dissolved in water is not rapid or intense, and I find that in batteries where the internal resistance is not a great factor this improved solution gives excellent results. Aluminium sulfate as contained in the alums can be used as the equivalent of the tersulfate of aluminium, and the chlorate of sodium can be replaced by a chlorate of the metals of the alkalies or alkali earths.

The aforesaid salts can be mixed dry in the proper proportion to form the charge and only require the addition of water.

I claim as my invention—

1. The battery compound consisting of sulfate of aluminium and chlorate of sodium, substantially as set forth.

2. The improved battery compound, consisting of a chlorate of a metal of the alkalies or alkali-earth metals and sulfate of aluminium, substantially as set forth.

Signed by me this 4th day of April, 1899.

HENRY BLUMENBERG, JR.

Witnesses:
GEO. T. PINCKNEY,
S. T. HAVILAND.